Aug. 23, 1932.   C. S. BRAGG ET AL   1,872,659
BRAKE SYSTEM FOR AUTOMOTIVE VEHICLES
Filed May 25, 1928   3 Sheets-Sheet 2
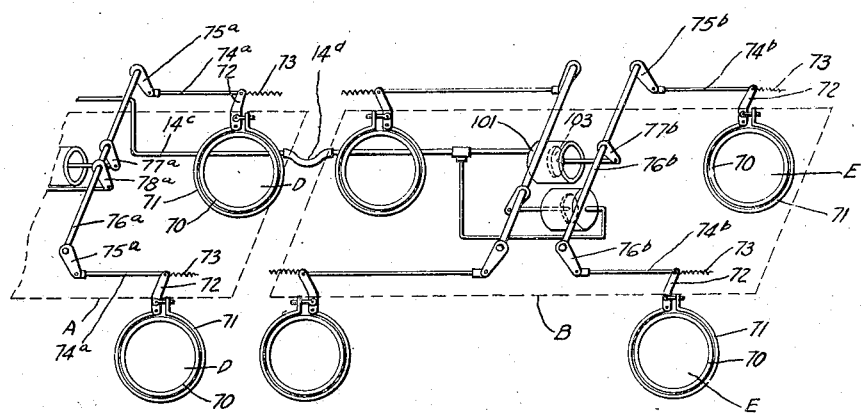
Fig. 1.ᵃ
INVENTOR.
Caleb S. Bragg
Victor W. Kliesrath
Attorney
H. O. Clayton

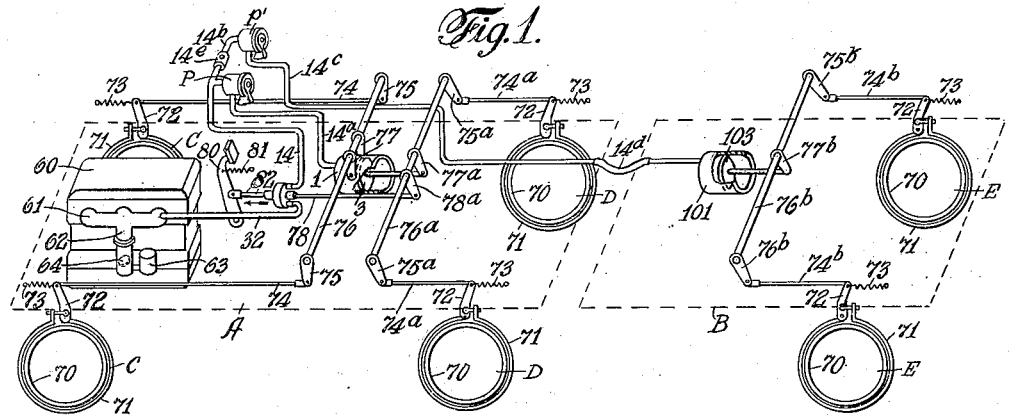

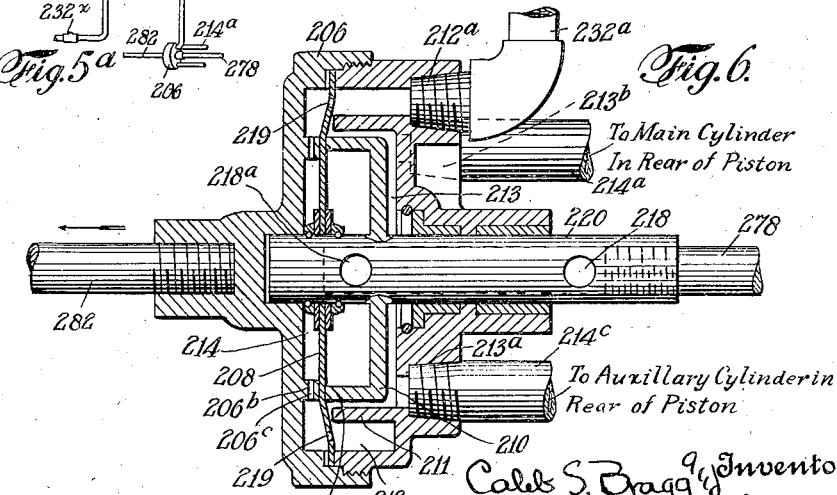

Patented Aug. 23, 1932                                           1,872,659

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed May 25, 1928. Serial No. 280,424.

Our invention consists in the novel features hereinafter described, reference being had to the accompanying drawings which show several embodiments of the invention selected by us for purposes of illustration, and the said invention is fully disclosed in the following description and claims.

Our invention relates to vacuum brake mechanism for automobiles in which the brake mechanisms are applied by a power actuator or power actuators operated by the differential between a partial vacuum most conveniently obtained by a connection with the throttle controlled portion of the suction passage of an internal combustion engine employed to propel the vehicle, or vehicles, and atmospheric or higher fluid pressure. Where atmospheric pressure is employed as the higher fluid pressure, there is a substantially constant maximum pressure of approximately 10 pounds per square inch at sea level available for the operation of the actuator, which maximum degree of rarification being obtained in the suction passage when the throttle valve is closed or nearly closed, (the proper position for the throttle valve when the brakes are to be applied).

The amount of braking force which can be applied to the wheels of a vehicle without locking the wheels will necessarily vary in accordance with variations in the coefficient of friction between the wheels and the roadway, and these variations are chiefly due to variations in the condition of the road surface, due to moisture, ice, etc., and to variations in the load supported by the wheels. Obviously it is most undesirable to apply at any time sufficient braking force to lock the wheels, as this will cause skidding, and in the case of four wheel brakes applied to both steering and non-steering wheels, the locking of steering wheels deprives the operator of all control of the direction of movement of the vehicle, which he can recover only by releasing all the brakes.

The object of our present invention is to provide a pressure regulating valve mechanism or mechanisms for controlling the maximum power application of the brakes independent of the controlling valve mechanism normally used for the application of the brakes, said pressure regulating valve being located between the actuator or actuators and the controlling valve mechanism therefor, where the actuator piston is maintained submerged in the higher fluid pressure or atmosphere when in released position, or between the actuator cylinder and a connection with the suction passage independent of the controlling valve mechanism where the actuator piston is maintained submerged in vacuum when in the released position, the same form of valve mechanism being adapted to both locations, said pressure regulating valve being constructed to maintain a predetermined degree of rarification available for the operation of the actuator or actuators, and therefore a predetermined available differential of fluid pressures, the air pressure being substantially constant, and said valve mechanism being readily adjustable to vary the available degree of rarification and therefore the differential of pressures to be maintained. We construct the power actuator, or actuators, and the connections therefrom to the brake mechanism actuated thereby in such manner that the wheels cannot ordinarily be locked by an application of the maximum power of the actuator or actuators when the wheels are upon average dry roadway and the vehicle wheels are under a predetermined load condition of the vehicle, for example when fully loaded, under which conditions the operator can apply the brakes with the full power of the actuator without danger of skidding. When the vehicle is lightly loaded or when passing over roadway which is wet, or muddy, or covered with ice or whenever the coefficient of friction between the wheels and the roadway is otherwise decreased, the pressure regulating valve or valves may be quickly adjusted by means within easy reach of the driver, so as to provide such reduced degree of rarification, available to the actuator as will permit the actuator to be operated with maximum force without locking the wheels. The brakes may therefore be fully applied by power, by the operator operated controlling valve mechanism without material danger of skidding under all variations of road or load conditions. The operator operated part for the brake applying valve mechanism is preferably connected with certain of the brake mechanisms, so that should greater power be needed for emergency application of the brakes, under any adjustment of the pressure regulating valve mechanism, the physical force of the operator may be applied to the connected wheel brake mechanisms only, and these brake mechanisms can also be applied by physical force alone in case of failure of power.

Our invention also comprises certain novel features of construction and combination of parts hereinafter described and particularly pointed out in the following description and claims.

In the accompanying drawings,

Fig. 1 is a diagrammatic view representing a tractor and trailer equipped with a vacuum brake system embodying our present invention, the actuators having their pistons maintained submerged in atmosphere when in retracted position.

Fig. 1a is a fragmentary view, similar in general to the system of Fig. 1, but disclosing a plurality of actuators for the trailer brakes, each actuator serving to operate a separate set of brakes on the trailer.

Fig. 2 is an enlarged sectional view of one form of the adjustable pressure regulating valve shown in Fig. 1.

Fig. 2a is a front view of the adjusting mechanism shown in Fig. 2.

Fig. 3 is an enlarged detail view of one form of controlling valve for the actuator, shown in Fig. 1.

Fig. 4 is a sectional view similar to Fig. 2, showing another form of the pressure regulating valve.

Fig. 5 is a view similar to Fig. 1, showing our invention embodied in a brake system in which the pistons of the power actuators are maintained submerged in vacuum when in released position.

Fig. 5a is a detail of a part of Fig. 5 showing a slight modification.

Fig. 6 is an enlarged sectional view of a controlling valve mechanism suitable for the installation shown in Fig. 5.

In Fig. 1 we have shown our invention embodied in a brake system for a tractor indicated diagrammatically by dotted lines at A, and a trailer indicated by dotted lines at B, but the invention is not limited to the number of vehicles upon which it may be installed. C, C, represent the steering wheel brake mechanisms and D, D, the non-steering wheel brake mechanisms of the tractor, A, and E, E, represent brake mechanisms for trailer B. The brake mechanisms may be of any preferred construction. As shown each consists of a drum, 70, band, 71, and lever, 72, provided with the usual retracting spring, 73. The brake levers for the steering wheel brake mechanisms of the tractor are here shown connected to a rock shaft, 76, by links, 74, and arms, 75, the non-steering brake mechanisms being similarly connected by links, 74$^a$, and arms, 75$^a$, to a rock shaft, 76$^a$, and the trailer brake mechanisms are similarly connected by links, 74$^b$, and arms, 75$^b$, with a rock shaft, 76$^b$, on the trailer. The tractor is shown in this instance provided with a power actuator comprising a cylinder, 1, closed at its forward end and open at its rear end, and provided with a piston, both cylinder and piston being movable with respect to the tractor as shown in our former application for Letters Patent of the United States filed Oct. 8, 1927, Serial No. 224,841, but this construction is not essential. The cylinder, 1, is shown pivotally supported on arms, 77, connected with the rock shaft, 76, while the piston, 3, is connected with an arm, 77$^a$, on the rock shaft, 76$^a$, so that a power stroke of the actuator causes the piston and cylinder to move toward each other and apply all of the brake mechanisms, C, C, D, D. The capacity of the actuator and the leverages of its connections with the brake mechanisms are preferably such that the wheels cannot be locked by the maximum power of the actuator, when the wheels are upon ordinary dry roadway and the vehicle loaded.

60 represents an internal combustion engine mounted on the tractor and provided with a suction passage comprising the intake manifold, 61, and a vertical portion, 62, leading from the carburetor, 63, to the manifold, and provided with the usual throttle valve, 64.

The actuator on the tractor is provided with a controlling valve mechanism which in this particular drawing is located exteriorly of the actuator for connecting the cylinder, 1, between its closed end and the piston, 3, with the atmosphere and with the suction passage between the throttle valve, 64, and the engine cylinders. In Fig. 3 we have illustrated one form of exterior valve mechanism shown and described and claimed in our former application for Letters Patent, filed Nov. 7, 1927, Serial No. 231,724, the specific construction of which therefore forms no part of our present invention and will only be sufficiently described to enable our present invention to be understood.

The valve mechanism shown comprises a hollow casing, 6, provided with a diaphragm, 8, the central portion of which is connected with a valve actuating part, 20, which is connected by a link, 82, with an operator operated part, i. e., a foot lever, 80, provided with the usual retracting spring, 81. The casing, 6, is connected by a link rod, 78, with an arm, 78$^a$, on the rock shaft, 76$^a$, connected with the brake mechanisms for the non-steering wheels of the tractor. The rear portion of the valve casing, 6, is provided interiorly with an annular seat, 11, normally engaged by the diaphragm and dividing the rear portion of the casing into a central chamber, 13, from which a flexible pipe, 14, extends to the actuator cylinder and an outer chamber, 12, connected by a flexible pipe, 32, to the suction passage of the engine between the throttle valve and the engine cylinders, and being preferably connected to the intake manifold, 61. The front portion of the valve casing communicates with the atmosphere by apertures so that the front face of the diaphragm is always exposed to atmospheric pressure, and the diaphragm is provided with apertures, 19, therein as shown. In the rear of the diaphragm is a disk or valve, 10, having an annular seat, 10ª, to engage the diaphragm and seal the casing in rear of the diaphragm from the atmosphere. The disc valve, 10, is normally in open position when the valve mechanism is in the released position as shown in Fig. 3, so that the atmospheric air can pass through the apertures, 19, and through pipe, 14, to the actuator as hereinafter explained, the differential of pressures on the portions of the diaphragm between the annular seat, 11, and the outer edge of the casing, 6, assisting the retracting spring, 81, in holding the diaphragm, 8, seated on seat, 11, thus cutting off the actuator from the suction pipe, 32, when the valve mechanism is in released position. As will be seen, a forward movement of the pedal lever will seat the disc valve, 10, on the diaphragm, and will then unseat the diaphragm from the seat, 11, connecting the cylinder with the suction pipe, 32, after disconnecting it from the atmosphere. After the brakes have been applied to the full extent of the power of the actuator, a further depression of the foot lever will bring the collar, 9, on the part, 20, into engagement with the forward wall of the casing and enable the operator to apply his physical force through the valve casing and link rod, 78, to the brake mechanism only for the non-steering wheels, indicated at D, D. It will also be seen that when the valve mechanism is moved into position to connect the actuator with suction, the forward face of the valve and that portion of the forward face of the diaphragm between the valve seat and the casing will be exposed to atmospheric pressure, while the corresponding portions of their rear faces will be exposed to rarification as the air is exhausted from the actuator cylinder, the differential of fluid pressures on the diaphragm providing a reactionary feature for the pedal lever, to enable the operator to determine by the increased pressure which he must exert on the pedal to keep the valve in this position, the amount of power which the actuator is exerting on the brake mechanisms.

Between the controlling valve mechanism and the actuator cylinder or cylinders, we locate a pressure regulating valve or valves, indicated as a whole at P, one form of which is illustrated, for example, in section in Fig. 2. Where several power actuators are employed to operate different sets of brake mechanisms under the control of a single valve mechanism, one of these pressure regulating valves may be employed for varying the maximum differential of pressures for all of the actuators, but where the brake mechanisms operated by different power actuators are subjected to different load conditions, as where different actuators operate the steering wheel brake mechanisms and non-steering wheel brake mechanisms of a single vehicle, for example, or where as illustrated in Fig. 1, the separate actuators operate brake mechanisms on separate vehicles, as a tractor and trailer, we prefer to employ one of these pressure regulating valves between the control valve mechanism and each of said actuators, in order that the maximum differential of fluid pressures available for the operation of each actuator may be independently varied. This is particularly desirable in the case of tractor and trailer, as it may frequently happen that the tractor vehicle is heavily loaded while the trailer is light, or vice versa.

In the form of pressure regulating valve, illustrated in Fig. 2 for example, which is our preferred form, the valve casing is illustrated at 30, and is provided with a cap or cover, 31, having an air inlet aperture or apertures, 32, in communication with the atmosphere, and a centrally located guiding aperture, 33. Within the casing is a partition member, indicated at 34, which in this instance is annular, the partition member dividing the interior of the valve casing into two chambers, in this instance a central chamber, 34ª, and an outer annular chamber, 35. The inner end of the partition member, 34, is provided with a seat, 34ᵇ, in this instance an annular seat for engaging a flexible diaphragm, 36, having its outer edge portion in sealing engagement with the valve casing and preferably clamped, as shown, between the casing and the cap or cover, 31. The diaphragm, 36, may be reinforced by a centrally located portion, indicated at 37, the area of which may be sufficient, as shown, to provide the seat engaging portions of the diaphragm, and this will be especially desirable where the diaphragm is made of material such as rubberized or impregnated fabric, or other material which would not readily make an air-tight connection when pressed against the seat, 34ᵇ.

While air is being exhausted from the actuator, the diaphragm is yieldingly held in an unseated position against a predetermined degree of rarification on its inner face, preferably by means of a spring provided with calibrating adjustment means and with a hand operated tension regulating means for varying the tension of the spring in accordance with the maximum degree of rarification desired for the operation of the power actuator.

In Fig. 2 for example, we have shown the diaphragm, 36, and its reinforcing portion, 37, provided with a stem, 39, extending through the guiding aperture, 33, in the cover, and through a coaxial aperture in a rotatable cam disc, 40, and through a corresponding aperture in a spring, 41, here shown in the form of a spider, the stem, 39, being threaded at its outer end, provided with an adjusting nut, 42, for calibrating the spring, 41. The cap or cover, 31, is provided in this instance, with an annular plate, 43, provided with segmental cam grades, 43ª, to engage corresponding segmental cam grades, 40ª, on the cam disc, 40, in a well known way, to enable the tension of the spring, 41, which is located between the adjusting nut, 42, and the cam disc, 40, to be adjusted by rotating the cam disc, 40, with respect to the stationary plate, 43, in a well known way. The rotary cam disc, 40, is provided with a hand lever, 40ᵇ, or other operating means for rotating it, and the stationary cam plate, 43, is preferably provided with an index plate, 43ᵇ, upon which are provided indications for different positions to which the arm or lever, 40ᵇ, may be moved to vary the tension of the spring, and thereby vary the maximum differential of fluid pressures available to the actuator (or actuators) controlled thereby in accordance with the variations of the coefficient of friction between the wheels of the vehicle and the roadway. These indications will preferably be such as to indicate the character of the road or the load condition, or both, for the different settings or positions of the adjusting arm or lever, 40ᵇ. For example, the index plate, 43ᵇ, may conveniently carry the following indications: Dry, Wet, Ice, Loaded, Medium, Light.

These indications are only given by way of example and the indications placed on the indicator plate, 43ᵇ, or otherwise provided in connection with the movable hand operated adjusting part, may be of any desired number and of any character preferred, it being understood that they will be so located that when the conditions expressed by any set of indications present themselves, the movement of the hand operated lever to bring it into coincidence with such indications will so adjust the spring connected with the flexible diaphragm as to provide a maximum differential of fluid pressure for the connected actuator or actuators, which will ordinarily prevent locking the wheels by the maximum power of the actuator under the conditions indicated. We do not limit ourselves to the exact constructions shown, but we have found that they provide a convenient and satisfactory means for accomplishing the desired results, the adjusting nut, 42, serving to calibrate the spring, and the rotary cam plate, 40, serving to effect the desired variations in the tension of the spring so calibrated to meet the different conditions for which the device is intended.

The pressure regulating valve is located preferably on or in connection with the dash or instrument board, so that the hand operated lever, 40ᵇ, is within convenient reach of the driver of the vehicle, and it will be understood that in the construction shown in Fig. 2 in which the rotary cam plate adjusting means is employed, the parts will remain in position to which they may be moved by the movement of the arm or lever, 40ᵇ, to secure the desired tension of the spring, 41.

The pressure regulating valve is interposed in the pipe, 14, previously referred to, extending from the chamber, 13, of the controlling valve mechanism to the power actuator, or actuators, one of the chambers, 34ª and 35, of the pressure regulating valve mechanism being connected to the valve mechanism, and the other to the actuator, or actuators. In this instance we have shown the central chamber, 34ª, connected directly with the pipe, 14, leading to the valve mechanism and the chamber, 35, connected by a pipe, indicated at 14ª, to the actuator cylinder, 1. Where, as in Fig. 1, we have a second brake mechanism provided with a separate actuator, comprising in this instance a cylinder, 101, open at one end and closed at the other, and provided with a piston, 103, connected with an actuating arm, 77ᵇ, on the rock shaft, 76ᵇ, for actuating the brakes, we prefer to provide a second pressure regulating valve, indicated as a whole at P¹, which is connected to the controlling valve mechanism by a branch pipe, 14ᵇ, connected with the pipe, 14, independently of the previously mentioned pressure regulating valve, P, and connected by a pipe, 14ᶜ, with the closed end of the cylinder, 101, a flexible portion, 14ᵈ, being conveniently arranged between the vehicles to accommodate relative movements thereof where the brake mechanisms are on separate vehicles. It will be understood that the pressure regulating valve, P¹, is constructed in the same manner as previously described with reference to Fig. 2, and that it is connected in the pipe line in the same manner, as previously described. We also prefer in such case to provide a cut-off valve, 14ᵉ, in the branch pipe, 14ᵇ, which can be closed when the trailer is disconnected from the tractor vehicle.

Referring now to the operation of the pressure regulating valve, it will be understood that if all of the parts of the brake system are in released positions, as indicated in Fig. 1, the controlling valve mechanism being in position to connect to pipe, 14, with the atmosphere as indicated in Fig. 3 and to shut off communication between the pipe, 14, and the source of suction, the pipe, 14, will be filled with atmospheric air as will the chambers of the pressure regulating valve or valves and the diaphragm, 36, of each pressure regulating valve will be held unseated with a yielding pressure depending upon the adjustment of the spring, 41, and both faces of the diaphragm will be subjected to atmospheric pressure. If it is assumed that the vehicles are proceeding under full load conditions over normally dry roadways, the adjusting arm, 40b, will be moved to a point on the indicator plate or scale corresponding with the dry and loaded indications, for example, thereby adjusting the spring to substantially its maximum tension. Assuming that the engine is in operation and the throttle valve, 64, is closed or partly closed, there will be a partial vacuum in the suction passage of the engine and the pipe, 32, leading to the controlling valve mechanism. If the operator now depresses the foot lever, 80, so as to close off the atmosphere from the pipe, 14, and connect it with the suction pipe, 32, as before described, the air will be withdrawn from the pipe, 14, the chambers 34a and 35 of the pressure regulating valve P, the pipe, 14a, and the cylinder, 1, of the actuator and in like manner from the corresponding chambers of pressure regulating valve, P1, and pipes communicating with the cylinder, 101, on the trailer, thus causing an operation of each actuator to apply the brake mechanisms connected therewith. A differential of fluid pressures will be created on the opposite faces of the diaphragms, 36, of the pressure regulating valves P and P1, due to the rarification within the valve casing and atmosphere pressure on the exterior face of the diaphragm. As the spring member, 41, of each pressure regulating valve has been adjusted to its maximum tension, the diaphragm, 36, will be held unseated and the full rarification in the suction passage of the engine will be available to each of the power actuators and the brakes will be applied to each vehicle with the maximum pressure without, however, locking any of the wheels. If greater braking pressure is desired, as in making an emergency stop or otherwise, the operator, by taking up the lost motion between the valve actuating part, 20, in the valve casing, may apply his physical force through the valve mechanism and in this instance, link rod, 78, and arm, 78a, to connected brake mechanisms, in this instance the brakes of the wheels, D, D.

Let it be supposed, however, that the vehicle or vehicles enter upon a portion of the roadway which is wet and slippery, where obviously the maximum power of the actuators would be sufficient to lock the wheels, the operator will instantly shift the adjusting lever, 40b, for example, to relieve the tension of the spring, 41, to the desired extent, as indicated on the scale or indicating plate by the word "Wet". In such case if the controlling valve mechanism is operated to connect the actuators with the suction passage of the engine in the manner previously described, the diaphragm will be held off the seat by a reduced spring pressure, and as soon as the chamber, 34a, of either of the pressure regulating valves has been exhausted so as to produce a differential of fluid pressures on the diaphragm, 36, thereof, sufficient to overcome the reduced spring resistance, the diaphragm will close and prevent further evacuation of the actuator cylinders, so that the brake mechanisms can only be applied with a reduced maximum differential of fluid pressure determined by the adjustment of the resistance spring of the pressure regulating valve connected therewith, and danger of locking the wheels under the different road conditions will be prevented.

By varying the adjustment of the spring, 41, of each pressure regulating device, therefore, within this range of variations, the degree of suction or rarification which can be produced in the power actuator cylinder connection therewith, and therefore the maximum differential of fluid pressures available to the actuators can be regulated as desired. It will be understood that when the foot lever is released and the pipe, 14, is restored to its connection with the atmosphere, the air will be admitted to the chambers, 34a, of the fluid pressure regulating valves, equalizing the pressures therein until the diaphragm is retracted by the spring resistance into unseated position and allowing the air to flow into the connected actuator cylinder or cylinders to release the brake mechanisms operated thereby.

Where as in Fig. 1, separate pressure regulating valves P and P1 are employed for independently regulating the maximum differential of fluid pressures available for operating the power actuator for the tractor brake mechanism and the power actuator for the trailer brake mechanism, this will be found particularly convenient to meet conditions arising where one vehicle is more heavily loaded, for example, than the other, as it enables the maximum power which may be applied to the brakes of either vehicle to be independently controlled under varying road and load conditions, so that the maximum power which shall be available can be safely applied without locking the wheels under the varying conditions stated.

It will be understood that under all conditions of operation and under all adjustments of the pressure regulating valve or valves the operator may apply his physical force through the pedal lever to certain of the brake mechanisms less than the whole number and preferably the brake mechanisms for the non-steering wheels of the tractor vehicle as shown in Fig. 1 in addition to the power of the actuator connected therewith and such brake mechanisms may also be applied by physical force alone in case of failure of power. Furthermore where a controlling valve mechanism of the kind illustrated in Fig. 3, is employed the operator will under all the variations in the available differential of fluid pressures be appraised at all times when applying the brakes by power of the amount of pressure being applied thereto by the resistance of the forward movement of the foot, which he must overcome in keeping the valve mechanism in position to effect or continue the power stroke of the actuator pistons.

In Fig. 4 we have shown a slightly modified form of pressure regulating device in which the parts corresponding to those illustrated in Fig. 2 are given the same reference numerals with the addition of 100 to avoid repetition. In this figure the valve casing, 130, as shown is provided with a segmental partition, 134, extending across the interior of the casing, and provided with a seat, 134$^b$, at its upper edge seat partition dividing the interior of the casing into two chambers, 134$^a$ and 135, one of which, as 134$^a$, is connected with the controlling valve mechanism by the pipe, 114, and the other chamber, 135, is connected by pipe, 114$^a$, with the cylinder of the actuator. The other parts shown are exactly the same as previously described with reference to Fig. 2 and the operation will be the same as that previously described.

In Fig. 1 we have shown our invention applied to a braking system in which the power actuators have their pistons subjected to atmospheric pressure on both faces when the brake mechanisms and controlling valve mechanism are in released position. Our invention is equally applicable to brake systems in which the piston or pistons of the power actuator or actuators is or are subjected to suction on both faces when in the released position. In the former case the brakes are applied by withdrawing air from the actuator cylinder forward of the piston and are released by again admitting air thereto and the pressure regulating valve is interposed between the controlling valve and the pipe leading therefrom to the forward end of the cylinder. In the latter case both ends of the actuator cylinder are closed, the forward end is at all times connected with the suction passage, and the brakes are applied by admitting air to the actuator cylinder in rear of the pistons, and are released by withdrawing it therefrom. In this case, therefore, it is necessary to insert a pressure regulating valve which limits the maximum degree of lower fluid pressure in the connecting pipe or passage between the source of suction and the forward end of the cylinder, in order to vary the power braking force by controlling the degree of rarification available for the operation of the actuator or actuators. In Fig. 5 for example, we have shown diagrammatically a brake system for tractor and trailer similar to that illustrated in Fig. 1, except that the power actuators are so arranged and constructed that their pistons are normally submerged in vacuum, when in released position. The parts shown in Fig. 5 which correspond with those in Fig. 1 have been given the same reference numerals with the addition of 200 to avoid repetition, and in Fig. 6 we have illustrated a slightly modified form of valve mechanism also covered by our former application, Serial No. 231,724, which may be conveniently employed for controlling the type of actuator illustrated in Fig. 5, although we do not limit ourselves to this form of valve mechanism.

The controlling valve mechanism illustrated in Fig. 6 comprises a casing, 206, provided with a diaphragm valve, 208, adapted to engage an annular seat, 211, which divides the portion of the casing on one side of the diaphragm into a central chamber, 213, and an annular suction chamber, 212, the diaphragm being provided with apertures, 219, in alignment with the suction chamber, 212, for placing the portion, 214, of the casing, on the opposite side of the diaphragm at all times in communication with the suction chamber, whether the diaphragm is seated or unseated. Within the chamber, 213, of the valve casing is a cup-shaped disc valve, 210, having an annular flange or seat, 210$^a$, for engaging the diaphragm, so as to make an air-tight connection therewith, the disc valve and the diaphragm being rigidly and sealingly connected with a hollow sleeve, 220, extending through an aperture in the valve casing, and provided with an inlet aperture, 218, for air or other higher pressure fluid, outside of the said casing, and a communicating aperture, 218$^a$, within the space between the disc valve and the diaphragm. In this instance the valve casing is connected by a link rod, 282, with the operator operated part, to wit, a foot lever, 280, provided with the usual retracting spring, 281, and the valve actuating sleeve, 220, is connected by a link rod, 278, with an arm, 278$^a$, on the rock shaft, 276$^a$, connected with the brake mechanisms for the non-steering wheels of the tractor vehicle, indicated at A$^1$ in Fig. 5. In the normal or released position of the valve mechanism which is shown in Fig. 6, the diaphragm valve is in engagement with the disc valve and is held thereby out of engagement with the seat, 211, the valve casing being provided preferably within the chamber, 214, with an annular abutment, 206$^b$, in alignment with the flange, 210$^a$, of the disc valve, to facilitate the seating of the latter upon the diaphragm, and this abutment is provided with transverse apertures, indicated at 206$^c$, so that the entire chamber on the opposite side of the diaphragm from the disc valve will be placed in communication with the suction passage, 212. It will also be seen that by taking up the lost motion between the disc valve, 210, and the casing, 206, the operator can apply his physical force to the brake mechanisms connected with the valve mechanism through the rod, 278, in this instance the non-steering wheel brake mechanisms of the tractor vehicle.

The valve casing is provided with an aperture, 212$^a$, which is adapted to be connected to the source of suction, in this instance the intake manifold, 261, of the internal combustion engine for propelling the vehicle. The valve casing is also provided with an aperture, 213$^a$, adapted to be connected with one of the actuators in rear of the piston thereof, and also with a similar aperture, indicated in dotted lines at 213$^b$, adapted to be connected to the other actuator cylinder in rear of the piston. Obviously any number of actuators could be connected to the valve casing for simultaneous control.

201 represents the cylinder of the main actuator on the tractor vehicle, indicated by the dotted line, A$^1$, which cylinder is closed at both ends and provided with a piston, 203, the piston rod of which is connected to an arm, 277$^a$, on the rock shaft, 276$^a$, for operating the non-steering wheel brake mechanisms, D$^1$, of the tractor vehicle. We have shown the cylinder, 201, movable longitudinally with respect to the cylinder, like the cylinder, 1, in Fig 1, and pivotally supported on arms, 277, secured to the rock shaft, 276, which is connected with the brake mechanisms, C$^1$, for the front or steering wheels of the tractor vehicle, as in Fig. 1. 301 represents the cylinder of the auxiliary power actuator on the trailing vehicle, indicated by dotted lines at B$^1$, said cylinder being also closed at both ends and provided with a piston, 303, the piston rod of which is connected with an arm, 277$^b$, operatively connected with the brake mechanisms, E$^1$, for the trailer. In this instance we have shown the main suction pipe, 232, connected with the intake manifold, 261, and provided with a branch pipe, 232$^a$, which is connected to the aperture, 212$^a$, of the controlling valve mechanism, communicating with the suction chamber, 212, thereof. The main suction pipe, 232, is also provided with a branch pipe, 232$^b$, which is connected with the cylinder, 201, forward of the piston therein. A pressure regulating valve, indicated at P$^2$, and constructed and operating as hereinbefore described and illustrated for example in Fig. 2, being inserted in this branch suction pipe, 232$^b$. Another branch pipe, 232$^c$, extends from the main suction pipe, 232$^a$, to the cylinder, 301, on the trailer, B$^1$, and is provided with a flexible portion, 232$^d$, extending from one vehicle to the other. This branch suction pipe, 232$^c$, is also provided with an independent pressure regulating valve, indicated at P$^3$, and constructed and operating as previously described and illustrated for example in Fig. 2. The main suction pipe is also shown provided with a cut-off valve indicated at 232$^e$, located in this instance between the pressure regulating valves, P$^2$ and P$^3$, for cutting off the branch suction pipe, 232$^c$, when the trailer is not in use.

One of the apertures communicating with the chamber, 213, of the valve mechanism, as the aperture, 213$^b$, is connected by a pipe, 214$^a$, with the main cylinder in rear of the piston therein, and the other of said apertures, as the aperture, 213$^a$, is connected with the corresponding end of the auxiliary cylinder, 301, by a pipe, 214$^c$, provided with a flexible portion, 214$^d$, between the vehicles. It will be noted that when the valve mechanism is in the released position in which it is shown in Fig. 6, the pipes, 214$^a$ and 214$^c$, are in communication with the chamber, 213, and with the vacuum chamber, 212, and the branch suction pipe, 232$^a$.

When the controlling valve mechanism, 206, is in the released position and the pressure regulating valve is set for maximum rarification and the engine is running, both ends of the actuator cylinders, 201 and 301, will be connected with the intake manifold, the pistons, 203 and 303, being maintained normally submerged in vacuum. It will also be seen that the pipe connections, 232$^b$ and 232$^d$, leading from the main suction pipe, 232, to the respective actuator cylinders forward of the pistons therein, which are at all times in communication with the intake manifold, may be independently controlled by the pressure regulating valves, P$^2$ and P$^3$. To apply the brake mechanism the operator will depress the pedal, 280, thereby moving the valve casing, 206, in the direction of the arrow with respect to the valve actuating sleeve, 220, permitting the diaphragm, 208, to seat on the seat, 211, and the disc valve, 210, to be thereafter unseated from the diaphragm, cutting off the portion of each actuator cylinder in rear of the piston from the suction passage of the engine and admitting atmospheric air or other higher pressure fluid to said portion of said cylinders, to effect a power stroke of each actuator to apply all brake mechanisms connected therewith. As the differential of fluid pressures upon each actuator piston is determined by the differences between the substantially constant pressure of the air or other higher pressure fluid in rear of the pistons and the degree of rarification on the forward sides of the piston, it will be seen that it is only necessary to provide pressure regulating valve or valves, P$^2$ and P$^3$, in the suction pipe leading to each actuator cylinder forward of the piston therein to control the maximum degree of rarification effective during the power stroke of the actuator or actuators to apply the brakes. As the degree of rarification in each actuator cylinder in the rear of the piston therein can only effect the release of the brakes, it is unnecessary to provide a pressure regulating valve in the branch pipe, 232$^a$. A higher degree of rarification within the cylinder to the rear of the piston would only cause a power release of the brakes instead of permitting the brakes to be released by their retracting means. When the brakes and connected parts are left in the off or released position for long periods of time, and the pressure regulating valve mechanism is set for less than the maximum degree of rarification, leakage may occur past the piston and the cylinder becomes submerged in the maximum degree of rarification. This will not materially effect the application of the brakes as the maximum vacuum obtained from the intake manifold of an internal combustion engine is approximately 20 inches of mercury, and therefore a forward movement of the piston to apply the brakes would normally result in a decrease in rarification within the cylinder forward of the piston below the control range of the pressure regulating valve. In other words, some air must be exhausted from the cylinder forward of the piston, and if the pressure regulating valve is firmly seated, this air remaining within the cylinder forward of the piston will cause a reduction in the degree of rarification until the degree of rarification equals that for which the pressure regulating valve is set. It is true this may not be the case where the actuator cylinder is much longer than the operative stroke of the piston, in which case the portion of the cylinder forward of the piston virtually constitutes a storage reservoir, and if a storage reservoir is used, it may be necessary to insert a pressure regulating valve in the pipe, 232$^a$, as indicated at P$^4$ in Fig. 5$a$. It will be understood that the size of the power actuators or their connection with the brake mechanisms is such that the wheels of the vehicle will not be locked on the average dry pavement when the vehicle is fully loaded, even when the pressure regulating valve is set for maximum vacuum. If greater braking force is necessary or desired, the operator can take up the lost motion between the disc valve, 210, and the valve casing, 206, and apply his physical force through the arm, 278$^a$, to the brake mechanisms connected therewith, in this instance the brake mechanisms for the rear wheels. To release the brake mechanisms it is only necessary to release the pressure on the foot pedal to effect the unseating of the diaphragm, 208, which will again connect each actuator cylinder in rear of its piston with the actuator on the other side of the piston and with the suction passage, equalizing pressures within the cylinder or cylinders and withdrawing the air previously admitted, and permitting the brakes to be instantly released and to be retracted by their retracting springs, which also return the pistons to normal position. It will be further understood that by adjusting the pressure regulating valves, P$^2$ and P$^3$, the available degree of rarification for the power stroke of each actuator can be regulated according to the frictional contact between the wheels and the roadway, to vary the power which can be applied to the brakes, so that they may be applied to the maximum by the controlling valve mechanism without locking the wheels and causing skidding, and it will also be seen that these valves may be independently adjusted to secure the desired available maximum braking power for the tractor and trailer respectively, under varying conditions of load, as previously explained with reference to Figs. 1 to 3.

It will be understood that the construction and operation of the pressure regulating valves, P$^2$ and P$^3$, in this embodiment of our invention, will be the same as previously described with reference to the embodiment shown in the preceding figures.

As shown in Figs. 5 and 5$a$, a check valve, 232$^x$, may be inserted in the suction pipe, 232, between the suction passage of the engine and the connections to the pressure regulating and controlling valve mechanisms for the purpose of maintaining the maximum rarification available, within the cylinder at all times, so that the brakes may be applied or held as applied should the motor stop. The check valve, as located, will permit the brakes to be released by equalization of pressures within the cylinder or cylinders even though there should be no suction available to withdraw the air admitted for an application of the brakes, as for example when the motor stalls.

What we claim and desire to secure by Letters Patent is:—

1. In a brake system for automotive vehicles provided with an internal combustion engine for propelling the same, having a throttle controlled suction passage, the combination with a plurality of power actuators, brake mechanisms operatively connected with each actuator, a single controlling valve mechanism for said actuators, connections for connecting said suction passage with said valve mechanism and with each of said actuators, and means for connecting said valve mechanism with a source of higher pressure fluid of substantially uniform pressure, of an independent pressure regulating valve in each portion of the aforementioned connections interconnecting the suction passage of the engine and each actuator, for regulating the degree of rarification available for the operation thereof, whereby said actuators may be substantially simultaneously operated to apply a maximum power as to each, determined by the pressure regulating valve therefor, to the brake mechanisms connected therewith.

2. In a brake system for automotive vehicles provided with an internal combustion engine for propelling the same, having a throttle controlled suction passage, the combination with a plurality of power actuators, brake mechanisms operatively connected with each actuator, a single controlling valve mechanism for said actuators, connections for connecting said suction passage with said valve mechanism and with each of said actuators, and means for connecting said valve mechanism with a source of higher pressure fluid of substantially uniform pressure, of an independent regulating valve in each portion of the aforementioned connections interconnecting the suction passage of the engine and each actuator, for regulating the degree of rarification available for the operation thereof, independent means for adjusting each of said pressure regulating valves, and an operator operated part connected with said controlling valve mechanism, whereby said actuators may be substantially simultaneously operated to apply a maximum power as to each, determined by the pressure regulating valve therefor, to the brake mechanisms connected therewith.

3. In a brake system for automotive vehicles provided with an internal combustion engine for propelling the same, having a throttle controlled suction passage, the combination with a plurality of power actuators, each comprising a cylinder and a piston therein, brake mechanisms operatively connected with each of said pistons, a single controlling valve mechanism for said actuators, connections for connecting said suction passage with said valve mechanism and with each of said actuators forward of the piston thereof, and means for connecting said valve mechanism with a source of higher pressure fluid of substantially uniform pressure, of an independent pressure regulating valve in each portion of the aforementioned connections interconnecting the suction passage of the engine and each actuator cylinder forward of the piston, for regulating the degree of rarification available for the operation thereof, and an operator operated part connected with said controlling valve mechanism, whereby said actuators may be substantially simultaneously operated to apply a maximum power as to each, determined by the pressure regulating valve therefor, to the brake mechanisms connected therewith.

4. In a brake system for automotive vehicles provided with an internal combustion engine for propelling the same, having a throttle controlled suction passage, the combination with a plurality of power actuators, each comprising a cylinder and a piston therein, brake mechanisms operatively connected with each of said pistons, a single controlling valve mechanism for said actuators, connections for connecting said suction passage with said valve mechanism and with each of said actuators forward of the piston thereof, and means for connecting said valve mechanism with a source of higher pressure fluid of substantially uniform pressure, of an independent pressure regulating valve in each portion of the aforementioned connections interconnecting the suction passage of the engine and each actuator cylinder forward of the piston, for regulating the degree of rarification available for the operation thereof, independent means for adjusting each of said pressure regulating valves, and an operator operated part connected with said controlling valve mechanism, whereby said actuators may be substantially simultaneously operated to apply a maximum power as to each, determined by the pressure regulating valve therefor, to the brake mechanisms connected therewith.

5. In a brake system for automotive vehicles provided with an internal combustion engine for propelling the same, having a throttle controlled suction passage, the combination with a plurality of power actuators, each comprising a cylinder and a piston therein, brake mechanisms operatively connected with each of said pistons, a single controlling valve mechanism for said actuators, connections for connecting said suction passage with said valve mechanism and with each of said actuator cylinders forward of the piston thereof, independently of said valve mechanism, means for connecting said valve mechanism with each of said cylinders in rear of the piston thereof, means for connecting said valve mechanism with a source of higher pressure fluid of substantially uniform pressure, of an independent pressure regulating valve in each portion of the aforementioned connections interconnecting the suction passage of the engine and each actuator cylinder forward of the piston thereof, for regulating the degree of rarification available for the operation thereof, and an operator operated part connected with said controlling valve mechanism, whereby said actuators may be substantially simultaneously operated to apply a maximum power as to each, determined by the pressure regulating valve therefor, to the brake mechanisms connected therewith.

6. In a brake system for automotive vehicles provided with an internal combustion engine for propelling the same, having a throttle controlled suction passage, the combination with a plurality of power actuators, each comprising a cylinder and a piston therein, brake mechanisms operatively connected with each of said pistons, a single controlling valve mechanism for said actuators, connections for connecting said suction passage with said valve mechanism and with each of said actuator cylinders forward of the piston thereof, independently of said valve mechanism, means for connecting said valve mechanism with each of said cylinders in rear of the piston thereof, means for connecting said valve mechanism with a source of higher pressure fluid of substantially uniform pressure, of an independent pressure regulating valve in each portion of the aforementioned connections interconnecting the suction passage of the engine and each actuator cylinder forward of the piston thereof, for regulating the degree of rarification available for the operation thereof, independent means for adjusting each of said pressure regulating valves, and an operator operated part connected with said controlling valve mechanism, whereby said actuators may be substantially simultaneously operated to apply a maximum power as to each, determined by the pressure regulating valve therefor, to the brake mechanisms connected therewith.

7. In a brake system for automotive vehicles including a tractor and trailer, provided with an internal combustion engine located on the tractor for propelling the vehicles, and having a throttle controlled suction passage, the combination with a power actuator located on the tractor and operatively connected with brake mechanisms therefor, a power actuator located on the trailer and operatively connected with brake mechanisms therefor, a single controlling valve mechanism for substantially simultaneously operating said actuators to apply the brake mechanisms of both vehicles, connections for connecting said suction passage with said valve mechanism and with each of said actuators, means for connecting said valve mechanism with a source of higher pressure fluid of substantially uniform pressure, of an independent pressure regulating valve in each portion of the aforementioned connections interconnecting the suction passage of the engine and each actuator, for regulating the degree of rarification available for the operation thereof, and an operator operated part on the tractor connected with said controlling valve mechanism, whereby the brake mechanisms of both tractor and trailer may be substantially simultaneously applied to a maximum extent as to each, determined by the pressure regulating valve therefor.

8. In a brake system for automotive vehicles including a tractor and trailer, provided with an internal combustion engine located on the tractor for propelling the vehicles, and having a throttle controlled suction passage, the combination with a power actuator located on the tractor and operatively connected with brake mechanisms therefor, a power actuator located on the trailer and operatively connected with brake mechanisms therefor, a single controlling valve mechanism for substantially simultaneously operating said actuators to apply the brake mechanisms of both vehicles, connections for connecting said suction passage with said valve mechanism and with each of said actuators, means for connecting said valve mechanism with a source of higher pressure fluid of substantially uniform pressure, of an independent pressure regulating valve in each portion of the aforementioned connections interconnecting the suction passage of the engine and each actuator, for regulating the degree of rarification available for the operation thereof, said pressure regulating valves being located on the tractor, independent means for adjusting each of said pressure regulating valves, and an operator operated part on the tractor connected with said controlling valve mechanism, whereby the brake mechanisms of each vehicle may be substantially simultaneously applied to a maximum extent determined by the pressure regulating valve for the actuator connected therewith.

9. In a brake system for automotive vehicles provided with an internal combustion engine for propelling the same, having a throttle controlled suction passage, the combination with a plurality of power actuators, brake mechanisms operatively connected with each actuator, a single controlling valve mechanism for said actuators, connections for connecting such suction passage with said valve mechanism and with each of said actuators, and means for connecting said valve mechanism with a source of higher pressure fluid of substantially uniform pressure, of an independent pressure regulating valve in each portion of the aforementioned connections interconnecting the suction passage of the engine and each actuator, for regulating the degree of rarification available for the operation thereof, whereby said actuators may be substantially simultaneously operated to apply a maximum power as to each, determined by the pressure regulating valve therefor, to the brake mechanisms connected therewith, said operator operated part being connected to certain of said brake mechanisms less than the whole number, for enabling the operator to apply his physical force thereto.

10. In a brake system for automotive vehicles including a tractor and trailer, provided with an internal combustion engine located on the tractor for propelling the vehicles, and having a throttle controlled suction passage, the combination with a power actuator located on the tractor and operatively connected with brake mechanisms therefor, a power actuator located on the trailer and operatively connected with brake mechanisms therefor, a single controlling valve mechanism for substantially simultaneously operating said actuators to apply the brake mechanisms of both vehicles, connections for connecting said suction passage with said valve mechanism and with each of said actuators, means for connecting said valve mechanism with a source of higher pressure fluid of substantially uniform pressure, of an independent pressure regulating valve in each portion of the aforementioned connections interconnecting the suction passage of the engine and each actuator, for regulating the degree of rarification available for the operation thereof, said pressure regulating valves being located on the tractor, independent means for adjusting each of said pressure regulating valves, and an operator operated part on the tractor connected with said controlling valve mechanism, whereby the brake mechanisms of each vehicle may be substantially simultaneously applied to a maximum extent determined by the pressure regulating valve for the actuator connected therewith, said operator operated part being connected with certain of the brake mechanisms for the tractor, for enabling the operator to apply his physical force thereto.

11. In a brake system for automotive vehicles including a tractor and trailer, provided with an internal combustion engine located on the tractor for propelling the vehicles, and having a throttle controlled suction passage, the combination with a power actuator located on the tractor, independent brake mechanisms for steering wheels and non-steering wheels of said tractor operatively connected to said actuator, a second actuator located on the trailer, brake mechanisms for the trailer connected therewith, a single controlling valve mechanism on the tractor for said actuator, connections for connecting said suction passage with said valve mechanism and with each of said actuators, means for connecting said valve mechanism with a source of higher pressure fluid of substantially uniform pressure, of an independent pressure regulating valve in each portion of the aforementioned connections interconnecting the suction passage of the engine and each actuator, independent means for adjusting each of said pressure regulating valves, and an operator operated part located on the tractor, connected with said controlling valve mechanism, for substantially simultaneously applying all of the brake mechanisms connected with each actuator, to a maximum extent determined by the pressure regulating valves therefor, said operator operated part being connected with brake mechanisms for non-steering wheels only of the tractor, to enable the operator to apply his physical force to said non-steering wheel brake mechanisms.

12. In a brake system for automotive vehicles provided with an internal combustion engine for propelling the vehicle, having a throttle controlled suction passage, the combination with brake mechanism, of a suction actuated power actuator comprising a cylinder closed at both ends, a piston in said cylinder connected with said brake mechanism, controlling valve mechanism for connecting said cylinder in rear of the piston alternately with said suction passage and with a source of higher fluid pressure at substantially uniform pressure, a tubular connection from the portion of the cylinder forward of the piston to said suction passage, independent of the connection between said controlling valve mechanism and the suction passage, and an operator operated part for said valve mechanism, of a pressure regulating valve located in said independent tubular connection and comprising a casing having separated chambers, one connected with said portions of the cylinder forward of the piston, and the other chamber being connected with said suction passage, said chambers being opened at their inner ends and provided with seating means, a pressure operated part having marginal portions in sealing engagement with said casing, and having its outer face subjected at all times to the pressure of said higher pressure fluid in a direction to seat said part upon said seating means and disconnect said chambers from each other, and yielding resistance means connected with said pressure operating part and acting in a direction to unseat it, said pressure operating part being seated whenever the differential of fluid pressures on its opposite faces is sufficient to overcome said resistance means, whereby a substantially constant maximum differential of fluid pressures is maintained available for the operation of said actuator.

13. In a brake system for automotive vehicles provided with an internal combustion engine for propelling the vehicle, having a throttle controlled suction passage, the combination with brake mechanism, of a suction actuated power actuator comprising a cylinder closed at both ends, a piston in said cylinder connected with said brake mechanism, controlling valve mechanism for connecting said cylinder in rear of the piston alternately with said suction passage and with a source of higher fluid pressure at substantially uniform pressure, a tubular connection from the portion of the cylinder forward of the piston to said suction passage, independent of the connection between said controlling valve mechanism and the suction passage, and an operator operated part for said valve mechanism, of a pressure regulating valve located in said independent tubular connection and comprising a casing having separated chambers, one connected with said portions of the cylinder forward of the piston, and the other chamber being connected with said suction passage, said chambers being opened at their inner ends and provided with seating means, a pressure operated part having marginal portions in sealing engagement with said casing, and having its outer face subjected at all times to the pressure of said higher pressure fluid in a direction to seat said part upon said seating means and disconnect said chambers from each other, and yielding resistance means connected with said pressure operating part and acting in a direction to unseat it, said pressure operating part being seated whenever the differential of fluid pressures on its opposite faces is sufficient to overcome said resistance means, whereby a substantially constant maximum differential of fluid pressures is maintained available for the operation of said actuator, and hand operated adjusting means for varying the maximum differential of fluid pressures available for the operation of the actuator in accordance with variations in the coefficient of friction between the vehicle wheels and the roadway.

In testimony whereof we affix our signatures.

CALEB S. BRAGG.
VICTOR W. KLIESRATH.